United States Patent [19]

Hafner et al.

[11] Patent Number: 5,955,681

[45] Date of Patent: Sep. 21, 1999

[54] GALVANIC ELECTRODE OF AN ELECTROMAGNETIC FLOW METER

[76] Inventors: Peter Hafner, Schwieriweg 15, CH-4410 Liestal; Robert Schäfer, Bodenmattstrasse 11, CH-4108 Witterswil (BL), both of Switzerland; Roland Unterseh, 16, rue de la petite Camargue, F-68300 Saint Louis, France

[21] Appl. No.: 09/048,657

[22] Filed: Mar. 26, 1998

Related U.S. Application Data

[63] Continuation-in-part of application No. 08/657,516, Jun. 3, 1996.

[30] Foreign Application Priority Data

Oct. 18, 1995 [EP] European Pat. Off. ............ 95 11 6405
Jun. 4, 1996 [EP] European Pat. Off. ............ 96 10 8893

[51] Int. Cl.⁶ ...................................................... G01F 1/60
[52] U.S. Cl. ......................................................... 73/861.17
[58] Field of Search ............................ 73/861.12–861.17

[56] References Cited

U.S. PATENT DOCUMENTS

| | | | |
|---|---|---|---|
| 3,180,144 | 4/1965 | Bennett . | |
| 3,358,075 | 12/1967 | Hunt | 73/861.12 X |
| 3,746,896 | 7/1973 | Gruner | 73/861.12 X |
| 3,771,361 | 11/1973 | Reznick . | |
| 3,813,938 | 6/1974 | Grisch et al. | 73/861.12 |
| 4,181,013 | 1/1980 | Wada | 73/861.12 |
| 4,269,071 | 5/1981 | Wada | 73/861.12 |
| 4,279,166 | 7/1981 | Gryn et al. | 73/861.12 |
| 4,297,895 | 11/1981 | Gryn | 73/861.12 |
| 4,297,896 | 11/1981 | May | 73/861.12 |
| 4,297,897 | 11/1981 | Young | 73/861.12 |
| 4,382,387 | 5/1983 | Hafner . | |
| 4,388,834 | 6/1983 | Schmoock . | |
| 4,422,337 | 12/1983 | Hafner . | |
| 4,517,846 | 5/1985 | Harrison et al. | 73/861.12 |
| 4,565,619 | 1/1986 | Gardner et al. . | |
| 4,773,275 | 9/1988 | Kalinoski | 73/861.12 |
| 4,899,593 | 2/1990 | Inami et al. | 73/861.12 |
| 4,912,838 | 4/1990 | Goto et al. | 73/861.12 X |
| 5,224,394 | 7/1993 | Kalonoski | 73/861.12 |
| 5,269,191 | 12/1993 | Wada | 73/861.12 |

FOREIGN PATENT DOCUMENTS

| | | |
|---|---|---|
| 1121347 | 8/1960 | Germany . |
| 1200558 | 9/1965 | Germany . |
| 2417022 | 4/1974 | Germany . |
| 0 088 759 | 8/1978 | Japan . |
| 0040713 | 4/1981 | Japan . |
| 0164917 | 12/1981 | Japan . |
| 0 172 515 | 10/1983 | Japan . |
| 0168323 | 9/1984 | Japan . |
| 0066122 | 4/1986 | Japan . |
| 4127021 | 4/1992 | Japan . |
| 4-290 919 | 10/1992 | Japan . |
| 1 122 890 | 11/1984 | U.S.S.R. . |
| 1 153 295 | 5/1969 | United Kingdom . |
| 2047409 | 11/1980 | United Kingdom . |
| 2 057 692 | 4/1981 | United Kingdom . |

*Primary Examiner*—William Oen
*Assistant Examiner*—Jewel Thompson
*Attorney, Agent, or Firm*—Bose McKinney & Evans

[57] ABSTRACT

This galvanic electrode of a flow sensor of an electromagnetic flowmeter for measuring the volumetric flow rate of an electrically conductive liquid flowing in a measuring tube is practically absolutely fluid-tight inserted in the wall of the measuring tube and has a highly constant wetting surface. The electrode comprises a shank having a first portion which is fitted fluid-tightly in a hole in the wall, an end face and a second portion having a smaller diameter than the hole and the first portion. A wetting surface formed by the end face and a second portion of the electrode shank. This second portion forms a gap between the surface of the hole. The gap is sufficiently wide and the surface of the hole has a low surface tension so that the liquid will penetrate into and fill the gap, and the wetting surface will remain constant under all operating conditions of the flowmeter.

4 Claims, 1 Drawing Sheet

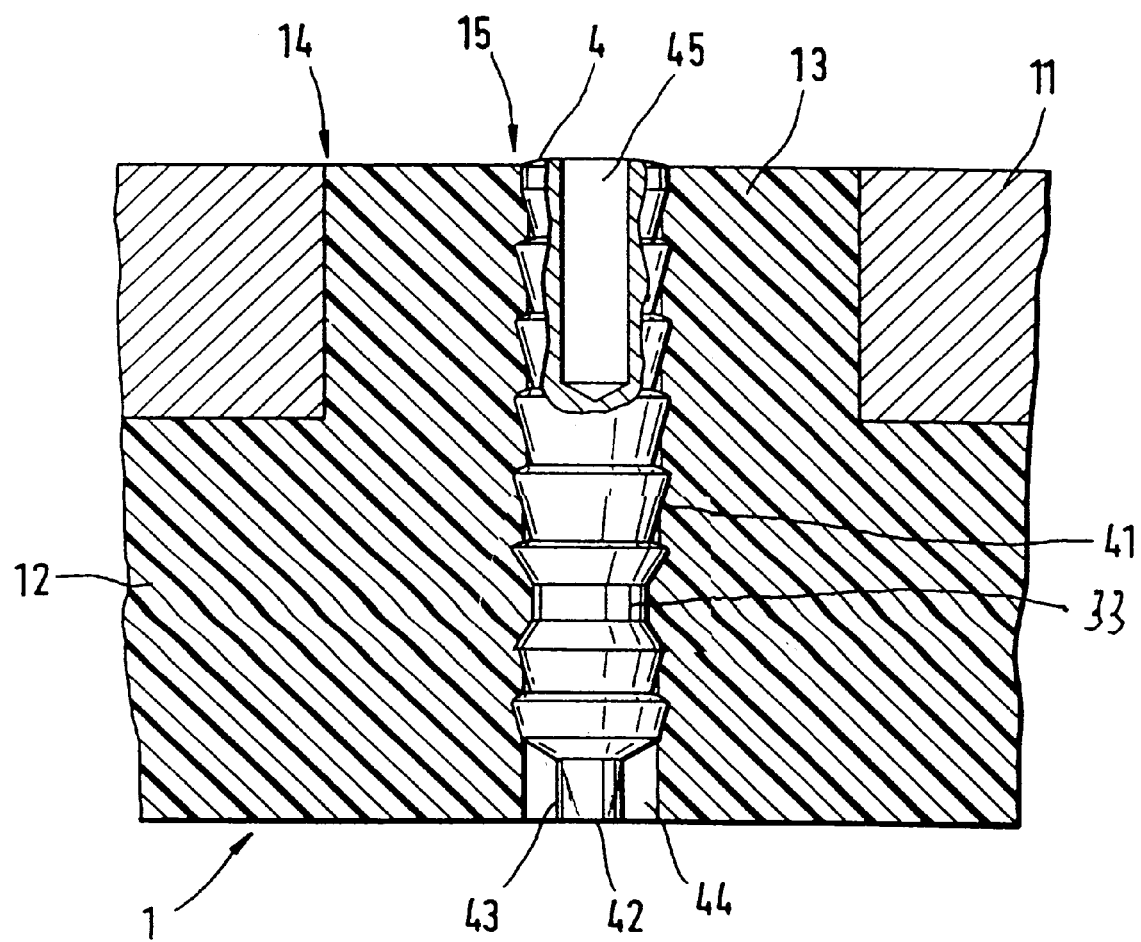

GALVANIC ELECTRODE OF AN ELECTROMAGNETIC FLOW METER

This application is a continuation-in-part of U.S. application Ser. No. 08/657,516 filed Jun. 3, 1996.

FIELD OF THE INVENTION

The present invention relates to a galvanic electrode of a flow sensor of an electromagnetic flowmeter.

BACKGROUND OF THE INVENTION

Electromagnetic flowmeters can be used to measure the volumetric flow rate of an electrically conductive liquid flowing in a measuring tube. The part of the measuring tube which comes into contact with the liquid is generally electrically nonconductive, so that a voltage induced in the liquid according to Faraday's law of induction by a magnetic field being perpendicular to the axis of the the measuring tube will not be short-circuited.

Therefore, metallic measuring tubes are commonly provided with an electrically nonconductive inner layer and are generally nonferromagnetic; in the case of measuring tubes made completely of plastic or ceramic, particularly alumina ceramic, the electrically nonconduative layer is not necessary.

The induced voltage is picked off by means of at least two galvanic electrodes, i.e., electrodes wetted by the liquid at an end face, or by means of at least two capacitive electrodes, i.e., electrodes mounted, for example, in the wall of the measuring tube. In general, these electrodes are mounted diametrically opposite to each other so that their common diameter is perpendicular to the direction of the magnetic field.

Galvanic electrodes are commonly fitted in a hole in the wall of the flow sensor. They are connected mechanically to the measuring tube in such way that a liquid-tight seal is realized. According to JP-A 4-290 919, particularly FIG. 6, for example, this is achieved by making the diameter of a shank of the electrode smaller than that of the hole and providing the shank with several sealing lips.

However, a problem arises from the fact that the insertion of the electrode results in mechanical stresses in the material in which the hole has been formed or with which it is lined.

In the case of plastic, such stresses result in the plastic "flowing", i.e., the part of the plastic exposed to the stress is displaced toward stress-free areas, particularly toward the interior of the measuring tube, where it forms forward arches which locally reduce the diameter of the measuring tube, thereby influencing the flow of the liquid in an inadmissible manner. This could be reduced by providing the sealing lips only in the part of the hole remote from the liquid.

In the area between the wetted end face and the nearest sealing lip, the prior-art electrode is not perfectly tight, because there a gap exists between the inside wall of the hole and the surface of the electrode shank. The effect of this gap has so far been left out of consideration.

As investigations have shown, the liquid penetrates into this gap more or less far depending on its pressure and/or its temperature and/or its state and/or its type or chemical composition. As a result, the electrode has a wetting surface which is not constant in time, and hence an electric impedance which is not constant in time.

Thus, an additional, temporally nonconstant interference voltage component is superimposed on the electrochemical interference voltage inherent in any galvanic electrode and, therefore, also superimposed on the measuring voltage. This additional interference voltage component is not completely controllable with conventional compensating means as are described, for example, in U.S. Pat. No. 4,382,387 and U.S. Pat. No. 4,422,337.

The electrodes disclosed in GB-A 1 153 295, GB-A 2 047 409, GB-A 2 057 692 and U.S. Pat. No. 4,773,275 try to solve the tightness problem by means comparable to those described in the above JP-A.

In GB-A 1 153 295, an outwardly extending short sleeve forming an electrode pocket is welded to an opening in the metallic measuring tube, and an insulating lining extends into the pocket. The electrode shank is surrounded by a slightly conical insulating bush which is press-fitted in the pocket, so that the end face tries to seal the shank. Thus, the pressure exerted on the lining by the press fit may also cause the aforementioned forward arching, the more so since the point of maximum pressure is located shortly behind the end face.

In the case of the electrode of GB-A 2 047 409, the end face of the electrode has been enlarged to form an electrode head at whose rear side, e.g., the side remote from the lumen of the measuring tube, a ciraumferential claw is provided which forces the material of the liner into the opening, which has a greater diameter than the electrode head. However, this area of the liner, which is subjected to tension, is not sufficiently resistant to thermal shock.

The electrode disclosed in GB-A 2 057 692 also has an enlarged head which draws the liner into the opening for the elecrode shank, so that the resistance to thermal shock in this area is also poor.

Furthermore, the electrode of this GB-A 2 057 692 has a cup-shaped part which is more or less sealingly fitted in a central longitudinal bore of the electrode shank. The outer surface of the bottom of the sleeve is flush with the end face of the electrode, so that a continuous end face is obtained.

According to FIGS. 3, 5, and 8 of this GB-A 2 057 692, however, no importance seems to be attached to the gap between the sleeve and the electrode, since no gap is shown in FIG. 3, while a narrow gap is shown in FIGS. 5 and 8 without being mentioned or explained in the description. In view of the illustrated length and narrowness of this gap it can be assumed that capillary forces act, so that the liquid will penetrate more or less far into the gap depending on the operating conditions and its state. Thus, like in the electrode disclosed in the above-mentioned JP-A 4-290 919, there is no constant wetting surface of the electrode. The electrode disclosed in U.S. Pat. No. 4,773,525 is an electrode of an electromagnetic flowmeter having a ceramic measuring tube. The electrode has an enlarged inner head with an diameter largely greater than that of its shank. The head is tightly fitted to the bottom of a recess in the wall of the measuring tube by using a separate gasket to be pressed between the bottom surface of the recess and the electrode head. The recess has a greater diameter than the electrode head. Therefore, a gap is present between the rim of the head and the wall of the recess.

But no importance seems to be attached to this gap, since it is neither mentioned or explained in the description nor has a reference numeral. Also here, it can be assumed that capillary forces act, so that the liquid will penetrate more or less far into the gap depending on the operating conditions and its state. Thus, like in the electrode disclosed in the above-mentioned JP-A 4-290 919 and GB-A 2 057 692, there is no constant wetting surface of the electrode.

SUMMARY OF THE INVENTION

An object of the invention is to solve the problems existing in the prior art referred to above, i.e., to provide a practically absolutely tight electrode and an electrode having a highly constant wetting surface.

To solve these problems the invention consists in a galvanic electrode of a flow sensor of an electromagnetic flowmeter for measuring the volumetric flow rate of an electrically conductive liquid flowing in a measuring tube having a part contacting the liquid that is elec-trically non-conductive, the electrode being inserted into a hole in a wall of the measuring tube and comprising:

an electrode shank having
    a first portion which is fitted fluid-tightly in the hole in the wall of the measuring tube,
    an end face and
    a second portion having
        a smaller diameter than the hole in the wall and the first portion and
        a surface adjoining the end face,
a wetting surface formed by the end face and the second portion of the electrode shank which is wettable by the liquid,
the second portion of the electrode shank and a surface of the hole in the wall of the measuring tube forming a gap, and
the gap being sufficiently wide and the surface of the hole having a low surface tension so that the liquid will penetrate into and fill the gap and the wetting surface will remain constant under all operating conditions of the flowmeter.

According to a first preferred embodiment of the invention the electrode is so designed that it can be inserted into the hole from the outer side of the measuring tube.

According to a second preferred embodiment of the invention the the electrode shank is fitted in the hole with a permanent mechanical prestress.

According to a third preferred embodiment of the invention the surface of the first portion of the electrode shank and/or the surface of the hole is provided with a surface-tension-decreasing layer.

According to a fourth preferred embodiment of the invention the hole in the wall is metallized.

An advantage of the invention is that a gap sufficiently wide to permit the liquid to penetrate into it and fill it is provided between the electrode shank and the wall of the hole.

BRIEF DESCRIPTION OF THE DRAWING

The invention will become more apparent from the following description of an embodiment thereof taken in conjunction with the sole FIGURE of the accompanying drawing.

DETAILED DESCRIPTION OF THE DRAWING

The sole FIGURE shows a part of a measuring tube 1 of a flow sensor of an electromagnetic flowmeter. The dimensions are not drawn to scale to show details more clearly. The measuring tube 1 comprises a metal tube 11 and a part 12 which comes into contact with an electrically conductive liquid that flows in the metal tube 11 and whose volumetric flow rate is to be measured. The part 12 is electrically nonconduotive, i.e., it may be made, for example, of a suitable plastic or a suitable rubber.

It is also possible to use a one-piece electrically nonconductive measuring tube, i.e., a measuring tube made entirely of a suitable plastic, a suitable rubber, or a suitable ceramic, if the wall of the tube is thick enough to accommodate a galvanic electrode. In that case, the metal tube 11 can be dispensed with.

The electrically nonconductive part 12 extends through a hole 14 in the metal tube 11 forming a cylindrical extension 13. The latter preferably has a constant diameter. The extension 13 has a through-hole 15 with a constant diameter less than that of the hole 14.

A first portion of a shank 41 of an electrode 4 contacting the liquid is fitted in the hole 15 in such a way that an end face 42 of the electrode shank 41 is wettable by the liquid. In addition to the end face 42, a surface 43 of a second portion of the electrode shank 41, which remains constant under all operating conditions, is permanently wetted by the liquid.

To this end, a gap 44 is provided between the surface 43 of the electrode 41 and the wall of the hole 15. The width of this gap 44 is such that under all operating conditions and in all states of the liquid, the latter can penetrate into and fill the gap.

As can be seen from the FIGURE, the gap 44 is realized by having reduced the diameter of the shank 41 in the area of the gap 44 with respect to shank diameter in its fitting portion.

As investigations have shown, the electrode impedance, and particularly its capacitive component, and the electrochemical potential must be independent of pressure variations occurring in the moving liquid and of pressure or impact loads acting on the measuring tube 1 from outside.

The first portion of the electrode shank 41 is fitted in the hole 15 fluid-tightly. This is preferably achieved by fitting with a permanent prestress and/or providing it with an area 33 of reduced, preferably greatly reduced, diameter which is capable of receiving material of the nonconductive part 12 of the measuring tube 11. Thus, at the electrode 4 or in the immediate vicinity thereof, the area 33 is provided to which material "flowing" under stress can be displaced. Consequently, no forward arches, which would influence the flow conditions, will form at the inside wall of the measuring tube.

To definitely ensure that the liquid will penetrate into the gap between the wall of hole 15 and the first portion of the electrode shank 41, its surface and/or the hole 15 may be provided with a surface-tension-decreasing layer.

The material of the electrically nonconductive part 12 may have such a low surface tension that the liquid will penetrate into and fill the gap 44, the surface of the electrode shank 41 being preferably provided with a surface-tension-reducing layer, too.

To provide the above-mentioned liquid-tight seal as far as possible the usual steps have to be taken. One of them is shown in the FIGURE, namely to provide the electrode shank 41 with successive frusto-conical sections in which the material in which the hole 15 was formed becomes caught.

In the embodiment, the electrode shank 41 has, at its end remote from the end face 42, a socket 45 for connecting a lead to the electrode 4. Any other conventional way of connecting the lead to the electrode is also possible, of course.

As can be seen from the FIGURE, the electrode 4 is, in contrary to, e.g., the electrode of the abovementioned U.S. Pat. No. 4,773,525, is so designed that it can be inserted into the hole 15 from the outer side of the measuring tube 1. Because of this overall design the electrode 4 can be inserted into the hole 15 from the inner side of the measuring tube 1, too. But this feature is not compulsory for the invention.

The end face 42 can have any desirable shape dependent on the kind of the fluid and its flow conditions, in particular if mashes, pulps, slurries, non-newtonian fluids etc. are to be measured. For example, this shape can be a cone, a sphere calotte, a paddle or a metal brush. In any case, the gap 44 is to be filled completely by the liquid.

We claim:

1. A galvanic electrode of a flow sensor of an electromagnetic flow meter for measuring the volumetric flow rate of an electrically conductive liquid flowing in a measuring tube having a metallic part and an electrically non-conductive part contacting the liquid and extending through a hole in a wall of the measuring tube thereby forming an extension, the electrode being inserted into a constant-diameter hole extending through the extension from an outer side of the extension, which is not in contact with the liquid, to an inner side of the extension, which is in contact with the liquid, the electrode comprising:

an electrode shank having
a first portion which is fitted fluid-tightly in the constant-diameter hole from the outer side of the extension with a permanent radial mechanical prestress, and
a second portion having
a smaller diameter than the constant-diameter hole and the first portion,
an end surface, and
a surface adjoining the end surface,
a wetting surface formed by the surface adjoining the end surface and by the end surface which is wettable by the liquid,
the surface adjoining the end surface of the second portion of the electrode shank and a surface of the constant-diameter hole forming a gap, and
the gap being sufficiently wide and the surface of the constant-diameter hole having a low surface tension so that the liquid will penetrate into and fill the gap and the wetting surface will remain constant under all operating conditions of the flowmeter.

2. A galvanic electrode of a flow sensor of an electromagnetic flowmeter for measuring the volumetric flow rate of an electrically conductive liquid flowing in a measuring tube having a part contacting the liquid that is electrically non-conductive, the electrode being inserted into a hole in a wall of the measuring tube and comprising:

an electrode shank having
a first portion which is fitted fluid-tightly in the hole in the wall of the measuring tube,
and end face, and
a second portion having
a smaller diameter than the hole in the wall and the first portion and
a surface adjoining the end face,
a wetting surface formed by the end face and the second portion of the electrode shank which is wettable by the liquid,
the second portion of the electrode shank and a surface of the hole in the wall of the measuring tube forming a gap, and
the gap being sufficiently wide and the surface of the hole having a low surface tension so that the liquid will penetrate into and fill the gap and the wetting surface will remain constant under all operating conditions of the flowmeter,
wherein the surface of the first portion of the electrode shank and/or the surface of the hole is provided with a surface-tension-decreasing layer.

3. A galvanic electrode as claimed in claim 1 wherein the constant-diameter hole is metalized.

4. A flow sensor of an electromagnetic flowmeter for measuring the volumetric flow rate of an electrically conductive liquid flowing in a measuring tube, the flow sensor comprising:

a measuring tube having a metallic portion and an electrically non-conductive portion, the electrically non-conductive portion having a constant-diameter opening extending therethrough from an outer side which is not in contact with the liquid to an inner side which is in contact with the liquid, and
an electrode positioned in the constant-diameter opening, the electrode comprising:
an electrode shank having
a first portion which is fitted fluid-tightly in the constant-diameter opening with a permanent radial mechanical prestress, and
a second portion having
a smaller diameter than the constant-diameter opening and the first portion,
an end surface, and
a surface adjoining the end surface,
a wetting surface formed by the surface adjoining the end surface and by the end surface which is wettable by the liquid,
the surface adjoining the end surface of the second portion of the electrode shank and a surface of the constant-diameter opening forming a gap, and
the gap being sufficiently wide and the surface of the constant-diameter opening having a low surface tension so that the liquid will penetrate into and fill the gap and the wetting surface will remain constant under all operating conditions of the flowmeter.

* * * * *